United States Patent [19]

Woo

[11] 4,261,881
[45] Apr. 14, 1981

[54] POLY-2-PYRROLIDONE COMPOSITION HAVING IMPROVED STABILITY AND METHOD OF EXTRUDING

[75] Inventor: Gar L. Woo, Tiburon, Calif.

[73] Assignee: Chevron Research Company, San Francisco, Calif.

[21] Appl. No.: 36,474

[22] Filed: May 7, 1979

[51] Int. Cl.³ .................................................. C08K 5/29
[52] U.S. Cl. ...................... 260/45.85 N; 260/45.9 D; 260/45.9 NC; 260/45.9 KA; 264/216
[58] Field of Search ................. 260/45.9 KA, 45.9 D, 260/45.9 NC, 45.85 N; 528/315, 326; 264/216

[56] References Cited

U.S. PATENT DOCUMENTS

| | | | |
|---|---|---|---|
| 3,026,301 | 3/1962 | Ney | 528/315 |
| 3,028,369 | 4/1962 | Butler et al. | 528/315 |
| 3,065,208 | 11/1962 | Papero et al. | 528/315 |
| 3,704,280 | 12/1972 | van der Loos et al. | 528/315 |
| 3,714,772 | 2/1973 | Bhakuni et al. | 260/45.78 C |
| 3,923,735 | 12/1975 | Schlichting et al. | 260/45.95 H |
| 4,071,486 | 1/1978 | Parker | 528/326 |
| 4,076,696 | 2/1978 | Neafsey | 528/326 |
| 4,083,827 | 4/1978 | House | 528/326 |

FOREIGN PATENT DOCUMENTS 43-13059 6/1968 Japan.
44-23509 10/1969 Japan.

Primary Examiner—V. P. Hoke
Attorney, Agent, or Firm—D. A. Newell; T. G. DeJonghe; L. S. Squires

[57] ABSTRACT

Poly-2-pyrrolidone compositions having improved thermal stability via the incorporation of an organic isocyanate or a thermal precursor thereof and methods of melt-extruding, and especially melt spinning such compositions.

21 Claims, No Drawings 4,261,881

POLY-2-PYRROLIDONE COMPOSITION HAVING IMPROVED STABILITY AND METHOD OF EXTRUDING

BACKGROUND OF THE INVENTION

1. Field of the Invention

This invention relates to poly-2-pyrrolidone compositions containing a small amount of an organic isocyanate and/or a thermal precursor thereof. In another aspect, this invention relates to methods of melt extruding, and especially melt spinning, such compositions.

2. The Prior Art

Poly-2-pyrrolidone is produced by the alkaline-catalyzed polymerization of 2-pyrrolidone in the presence of carbon dioxide (see U.S. Pat. No. 3,721,652). Polypyrrolidone so-produced can be melt-spun into filaments by extrusion from multi-hole spinnerets. In melt-spinning, the polymer composition is extruded in a molten condition at a melt temperature which is generally greater than about 270° C. This extrusion must be carried out with care because of the propensity of the polymer to thermally degrade, reverting back to monomer. As well as causing substantial product loss and process ineconomies this can also cause bubbles and the formation of voids or pox marks in the extrudate or filaments. Moreover, in addition to monomer reversion, the molecular weight of the resulting poly-2-pyrrolidone filaments is less than the molecular weight of the original polymer, and the filaments have lower tensile strength and poorer fibrillation properties.

If extrusion is attempted at appreciably lower temperatures to avoid thermal decomposition, the material is not properly melted and fibers of substantially lower tensile strength are produced. Consequently, in order to melt extrude polypyrrolidone efficiently, one may either seek to increase the thermal stability of the polymer, or to improve the extrudability of the polymeric composition.

The unusual propensity of poly-2-pyrrolidone to thermally degrade back to its monomer and the adverse effect on melt spinning or extrusion is recognized to be a serious problem and the prior art has made a number of attempts to mitigate this problem. For example, U.S. Pat. No. 3,052,654 attempts to reduce degradation occurring during melt extrusion by pre-heating the poly-2-pyrrolidone to remove degradation products, e.g., pyrrolidone. U.S. Pat. No. 3,017,393 teaches that the extrusion degradation problem may be alleviated by washing or treating the polymer with an aqueous organic carboxylic acid solution and similarly, U.S. Pat. No. 3,072,615 teaches using dilute aqueous fatty acid.

U.S. Pat. No. 3,009,893 teaches that the problem may be reduced by the incorporation of relatively large amounts of certain substances which apparently function as melting point depressants.

Japanese Pat. No. 44-23509 (1969) discloses a two step process for improving the thermal stability of polypyrrolidone which comprises first treating polypyrrolidone with an alcohol in the presence of a strong inorganic acid or organic sulfonic acid followed by treatment with a monoisocyanate. Patentee further teaches that if the monoisocyanate treatment is performed without the prior alcohol treatment the polypyrrolidone will be colored and its thermal stability will be greatly reduced.

Japanese Pat. No. 43-13059 (1968) discloses a two step process for improving the thermal stability of polypyrrolidone which comprises treating polypyrrolidone with an aqueous boric acid solution followed by treatment with an organic isocyanate. Patentee also teaches that if the monoisocyanate treatment is performed without the prior alcohol treatment the polypyrrolidone will be colored and its thermal stability will be greatly reduced.

Also, with respect to nylon-6 the text Nylon Plastics, edit by Melvin I. Kohan; John Wiley & Sons teaches on page 67, Table 2-3 that the salt formation or reaction of nylon-6 with isocyanate eliminates end groups to decrease the rate of lactam monomer formation in nylon-6.

The prior art has also proposed various other additives to mitigate the thermal monomer reversion of nylon-4, however, the problem is necessarily empirical in nature and until a given substance has actually been tried, it cannot be predicted whether it will have a beneficial effect.

SUMMARY OF THE INVENTION

Broadly, the present invention provides a poly-2-pyrrolidone composition and melt extrusion process which significantly reduces the amount of thermal monomer reversion and/or molecular weight degradation.

In one embodiment, the invention comprises a composition comprising a major amount of normally solid virgin poly-2-pyrrolidone and a minor amount, based on the poly-2-pyrrolidone, of one or more organic isocyanates, and/or thermal precursors thereof, effective to reduce thermal degradation i.e. reversion to monomer and/or molecular weight degradation.

In another embodiment, the invention comprises a process which comprises melt extruding the composition of the invention at extrusion melt temperatures in the range of about 260°–280° C.

FURTHER DESCRIPTION OF THE INVENTION AND PREFERRED EMBODIMENTS

The composition of the invention comprises a major amount of a virgin poly-2-pyrrolidone and a small amount of an organic isocyanate having at least 6 carbon atoms and a boiling point of at least about 250° C., or a thermal precursor thereof, effective to reduce the thermal degradation of the poly-2-pyrrolidone during melt extrusion. Preferably the composition contains about from 0.2 to 6% by weight, based on the weight of poly-2-pyrrolidone, of said organic isocyanate and/or said thermal precursor. Best results are typically obtained using about from 1 to 3% by weight based on the weight of poly-2-pyrrolidone. Optimum concentration can vary somewhat within these ranges with the particular organic isocyanate or thermal precursor, or mixture thereof, used, but can be determined by routine experimentation.

Broadly, the organic isocyanates used in the invention comprise an organic moiety having one or more isocyanate substituents. Such organic isocyanates include both aliphatic, alicyclic, heterocyclic, saturated and unsaturated, and aromatic compounds, and can contain substitutents in addition to the isocyanate groups which are compatible with the isocyanate groups and poly-2-pyrrolidone.

Suitable compounds which can be used include, for example, alkyl isocyanates, cycloalkyl isocyanates; alkylcycloalkyl isocyanates; polycycloalkyl isocyanates and cycloalkyl-alkylene-dicycloalkyl isocyanates (I);

aryl and alkylaryl isocyanates (II); polyether glycol isocyanates (III); and the like, such as, for example, represented by the following sub-generic formulas:

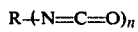 (I);

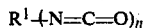 (II); and

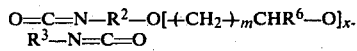 (III);

wherein R is alkyl, having at least 6 carbon atoms; preferably from 6 through 27 carbon atoms, cycloalkyl, having from 6 through 8 carbon atoms; alkylcycloalkyl, having from 6-16 carbon atoms, polycycloalkyl having 6 through 24 carbon atoms or cycloalkyl-alkylene-cycloalkyl, having from 7 through 24 carbon atoms; $R^1$ is an aryl group having 6 through 27 carbon atoms or a mono or dialkyl aryl group having 7 through 27 carbon atoms; and preferably is phenyl; $R^2$ and $R^3$ are independently selected from the group consisting of alkylene or arylene each having 6 through 12 carbon atoms and alkylarylene having 7 through 14 carbon atoms, and preferably are independently selected from the group of phenylene, tolylene and xylylene; $R^6$ is hydrogen or alkyl having 1 through 6 carbon atoms (e.g., methyl); n is a whole integer of from 1 up to the maximum isocyanate saturation permitted by the particular R or $R^1$ group (typically n is in the range of from 1 through 4); m is a whole integer from 1 to 11; and x is a whole integers of from 1 to 100 and preferably from 5 to 20. Generally the monoisocyanates (n is 1) which have boiling points of at least 250° C. have at least ten carbon atoms.

Typical alkyl polyisocyanates which can be used include, for example, hexyl 1,2-diisocyanate; 2-methylheptyl 1,3-diisocyanate; 2-ethyldecyl 1,7,10-triisocyanate; decyl 1,6-diisocyanate; dodecyl isocyanate; dodecyl 1,12-diisocyanate; eicosyl isocyanate and the like. Typical cycloalkyl and alkylcycloalkyl polyisocyanates which can be used include, for example, cyclopentyl 1,3-diisocyanate, 3-isocyanatomethyl-3,5,5-trimethylcyclohexylisocyanate, and the like. Typical polycycloalkyl polyisocyanates include, for example, 1,1'-bicyclohexyl 4,4'-diisocyanate. Suitable cycloalkyl-alkylene-cycloalkyl polyisocyanates include, for example, cyclohexyl-methylene-cyclohexyl 4,4'-diisocyanate, and the like. Typical aryl polyisocyanates and mono or dialkylaryl polyisocyanates which can be used include, for example, phenyl 1,4-diisocyanate; phenyl 1,2,4-triisocyanate; phenyl 1,3,4,6-tetraisocyanate; tolylene 2,6-diisocyanate; naphthyl 1,6-diisocyanate, xylene 3,4,6-triisocyanate, and the like. Typical polyether glycol polyisocyanates which can be used include, for example, polyalkylene ether glycol diisocyanate (e.g., the product from one mol of polyethylene glycol and two mols of toluene diisocyanate).

The thermal precursors of the organic isocyanates, used in the invention, are organic compounds which generate such organic isocyanates when subjected to temperatures in the range of about from 35° to 265° C. and preferably in the range of about 50° to 250° C. without generating substances which adversely affect poly-2-pyrrolidone. Suitable thermal precursors include, for example, organic carbamates which thermally decompose to yield organic isocyanates.

The organic isocyanates and thermal precursors used in the invention are generally known compounds and generally can be obtained from known sources or can be prepared by known procedures or obvious modifications thereof (e.g., substitution of appropriate substrates and solvents, etc.).

The organic isocyanate or thermal precursor can be admixed with the poly-2-pyrrolidone by any suitable mixing procedure. For example, the materials can be conveniently mixed by coating pellets of poly-2-pyrrolidone with the organic isocyanate or precursor before melt extrusion, or by pelletizing the poly-2-pyrrolidone resin with the desired amount of the organic isocyanate. Where desirable, the isocyanate or precursor can be dissolved in a solvent before being mixed with the poly-2-pyrrolidone and the solvent then removed (e.g., evaporated at low temperatures) prior to melt extrusion.

The improvement in thermal stability permits the poly-2-pyrrolidone composition of the invention to be melt extruded at melt temperatures in the range 260°–285° C. and preferably less than about 280° C., and most preferably below 275° C., using ordinary commercial spinning equipment known to the synthetic textile art, and generally affords higher-quality (higher molecular weight) filaments. By this invention the amount of 2-pyrrolidone generated during extrusion can be substantially reduced thereby reducing the number of filament breaks and dripping and foaming at the base. The filaments obtained in accordance with the present invention generally possess superior filament textile properties (e.g., tenacity, fibrillation) and generally also have higher weight average molecular weights than filaments melt spun without the isocyanate additive. Although the present process is primarily concerned with the melt extrusion of filaments, it could also be applied to melt extrude pellets, films or other shaped articles.

The "normally solid" poly-2-pyrrolidone used in the present invention typically has a weight average molecular weight in excess of about 5000 (typically about from 5000 to 500,000) and preferably in excess of about 50,000. Higher-molecular-weight poly-2-pyrrolidone polymers can also be used.

DEFINITIONS

As used herein, the following terms have the following meanings unless expressly stated to the contrary. The term "alkyl" refers to both straight-chain and branched-chain alkyl groups, typically having from 1 through 27 carbon atoms. Typical alkyl groups include for example, methyl, ethyl, isopropyl , n-butyl, t-butyl, hexyl, decyl, tetradecyl, 4-methyl hexadecyl, eicosyl, and the like. The term "lower alkyl" refers to alkyl groups having from 1 through 6 carbon atoms.

The term "alkylene" when used as a radical refers to an aliphatic diradecal, for example, $-(CH_2)_{n'}-$ wherein n' is a whole number.

The term "arylene" refers to an aromatic group having two unsatisfied valances, for example, phenylene, 2-methylphenylene and the like.

The term "alkoxy" refers to the group XO— wherein X is alkyl as defined hereinabove.

The term "cycloalkyl" refers to monocycloalkyl groups having 3 through 8 carbon atoms. Typical cycloalkyl groups include, for example, cyclopropyl, cyclopentyl, cyclohexyl, cyclooctyl and the like.

The term "aryl" refers to the groups containing one or more phenyl groups and includes, for example, phenyl, biphenyls, and fused polyphenyls (e.g., naphtyl). The term "alkylaryl" refers to "aryl" groups having one or more alkyl substituents as defined hereinabove. Typical alkylaryl groups include, for example, tolyl, 2,3-dimethylphenyl; 2-propylphenyl; 3-hexylphenyl, 2-methylnaphthyl; 2-methyl-8-decylnaphthyl, and the like.

The term virgin poly-2-pyrrolidone refers to poly-2-pyrrolidone which has not been subjected to a thermal stabilization treatment or pretreatement.

specific viscosities of 0.1 g of known weight average molecular weight polymers in 100 ml of m-cresol at 25° C. As determined by this procedure the initial poly-2-pyrrolidone had a weight average molecular weight, prior to the thermal test of about 360,000).

Duplicate tests were run for each composition. The results reported in the following table are the average of the two tests.

TABLE I

THERMAL STABILITY

| Additive | Wt. % Added | Monomer Formed, Wt. % | Decrease in Monomer Formation, % | Mw[1] After Heating |
|---|---|---|---|---|
| Control | 0 | 13.4 | — | 35,000 |
| 1,6-Diisocyanato-hexane | 0.2 | 12.2 | 9 | 39,000 |
| 1,6-Diisocyanato-hexane | 0.5 | 12.6 | 6 | 36,000 |
| 1,6-Diisocyanato-hexane | 1 | 11.3 | 16 | 43,000 |
| 1,6-Diisocyanato-hexane | 2 | 11.0 | 18 | 38,000 |
| 1,6-Diisocyanato-hexane | 3.0 | 9.7 | 28 | 52,000 |
| PEGD[2] | 0.5 | 9.7 | 28 | 39,000 |
| PEGD[2] | 1.0 | 9.3 | 31 | 39,000 |
| PEGD[2] | 2.0 | 10.1 | 25 | 38,000 |
| PEGD[2] | 3.0 | 11.0 | 18 | 43,000 |
| PEGDC[3] | 0.5 | 10.5 | 22 | 36,000 |
| PEGDC[3] | 1.0 | 8.9 | 34 | 37,000 |
| PEGDC[3] | 2.0 | 9.3 | 31 | 43,000 |
| PEGDC[3] | 3.0 | 8.7 | 35 | 43,000 |
| PEGD(2)[4] | 1.0 | 10.3 | 23 | 40,000 |

[1]Determined from solution viscosity as described above.
[2]PEGD - a polybutylene ether glycol diisocyanate sold under the trademark ADIPRENE L-213 by E. I. duPont de Nemour.
[3]PEGDC - a polyalkylene ether glycol dicarbamate having the general formula

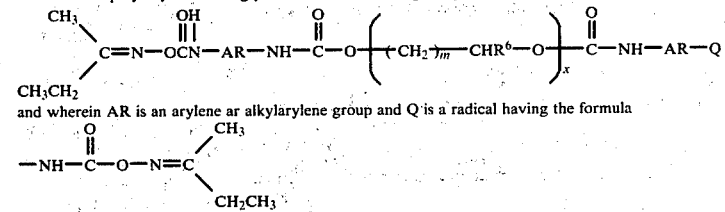

and wherein AR is an arylene ar alkylarylene group and Q is a radical having the formula $$-NH-\overset{O}{\underset{\|}{C}}-O-N=C\overset{CH_3}{\underset{CH_2CH_3}{\diagup}}$$

m is 1, 2 or 3; and x is a whole integer of from 5 to 20; sold under the trademark ADIPRENE BL-16 by E. I. duPont de Nemour.
[4]PEGD(2) - a polyalkylene ether glycol diisocyanate sold under the trademark ADIPRENE L-315 by E. I. duPont de Nemour & Co.

EXAMPLES

A further understanding of the invention can be had from the following non-limiting examples.

EXAMPLE 1

This example demonstrates the improvement in thermal stability obtained by the present invention. In this example, various poly-2-pyrrolidone samples were prepared. The respective samples are identical save for the particular organic isocyanate or the amount used.

The respective samples and a control sample containing only poly-2-pyrrolidone were respectively tested on a Mettler FP-2 hot stage at 269° C. for 5 minutes. The samples were then extracted with water and weighed. Since the pyrrolidone is soluble in water, whereas poly-2-pyrrolidone is insoluble, the difference in weight between the initial sample and the extracted sample represents the weight of poly-2-pyrrolidone lost by thermal degradation. The weight average molecular weight of the extracted sample was then determined by solution viscosity using a 5% (e.g. 0.4 g/4 ml 88% wt. HCO$_2$H) solution of the dried extracted polymer sample in 88% aqueous formic acid, and applying a Gardner viscosity-molecular weight type relationship developed from As can be seen from the above table, the compositions of the present invention substantially reduced both the amount of thermal monomer reversion and also generally very significantly reduced the amount of molecular weight degradation.

EXAMPLE 2

In this example another set of tests were conducted in the same manner as described in Example 1, with the exception that a different batch of poly-2-pyrrolidone having a weight average molecular weight of 42,000 was used and the samples were heated for 3 minutes at 269° C. on the hot stage.

The results of these tests are summarized in the following table.

TABLE II

THERMAL STABILITY

| Additive | Wt. % Added | Monomer Formed, Wt. % | Decrease in Monomer Formation, % | Mw[1] After Heating |
|---|---|---|---|---|
| Control | 0 | 17.4 | — | 24,000 |

TABLE II-continued
THERMAL STABILITY

| Additive | Wt. % Added | Monomer Formed, Wt. % | Decrease in Monomer Formation, % | Mw[1] After Heating |
|---|---|---|---|---|
| 1,6-diisocyanato-hexane | 0.2 | 12.8 | 26 | 27,000 |
| 1,6-diisocyanato-hexane | 0.5 | 12.2 | 30 | 29,000 |
| 1,6-diisocyanato-hexane | 3.0 | 10.6 | 39 | 29,000 |
| PEGD[2] | 0.5 | 15.2 | 13 | 24,000 |
| PEGD[2] | 1.0 | 11.5 | 34 | 34,000 |
| PEGD[2] | 3.0 | 12.2 | 30 | 38,000 |
| PEGDC[3] | 0.5 | 14.7 | 16 | 26,000 |
| PEGDC[3] | 1.0 | 14.4 | 17 | 24,000 |
| PEGDC[3] | 3.0 | 12.7 | 27 | 18,000 |

[1]see footnote 1 of Table I.
[2]see footnote 2 of Table I.
[3]see footnote 3 of Table I.

As can be seen from the above table, the compositions of the invention had both substantially lower thermal monomer reversion and significantly higher molecular weights after the thermal treatment than the untreated control sample.

EXAMPLE 3

In this example a third set of tests were run, again following the procedure of Example 1, but using a different batch of poly-2-pyrrolidone having a weight average molecular weight of 350,000. The respective samples were applied to the hot stage and heated at 269° C. for five minutes.

The results of these tests are summarized in the following Table III.

TABLE III THERMAL STABILITY

| Additive | Wt. % Added | Monomer Formed, Wt. % | % Decreased in Monomer Formation | Mw[1] After Heating |
|---|---|---|---|---|
| Control | 0 | 12.1% | — | 36,000 |
| ITP[4] | 1 | 12.5 | −(3.3) | 46,000 |
| ITP[4] | 2 | 11.7 | 3.3 | 45,000 |
| ITP[5] | 1 | 12.0 | .8 | 45,000 |
| ITP[5] | 2 | 12.0 | .8 | 45,000 |
| PIC[6] | 1 | 11.8 | 2.5 | 45,000 |
| PIC[6] | 2 | 9.9 | 18.2 | 43,000 |
| PIC[7] | 1 | 10.6 | 12.4 | 35,000 |
| MAI[8] | 1 | 11.7 | 3.3 | 52,000 |
|  | 2 | 10.3 | 14.9 | 46,000 |

[1]See footnote 1 of Table I.
[4]An isocyanate terminated polyester sold under the trademark MULTRATHANE F-242 by Mobay Chemical Corporation.
[5]An isocyanate terminated polyester sold under the trademark MULTRATHANE E-410 by Mobay Chemical Corporation.
[6]A modified polyisocyanate sold under the trademark MONDUR 501 by Mobay Chemical Corporation.
[7]A modified polyisocyanate sold under the trademark MONDUR MB by Mobay Chemical Corporation.
[8]A mixture of $C_{12}$ and $C_{18}$ alkyl monoisocyanate sold under the trademark TONCO 90 by The Upjohn Corporation.

In this use the reduction in monomer generation was not as outstanding as in the previous examples, but, with one exception the weight average molecular weight was very significantly improved.

Obviously, many modifications and variations of the invention, described hereinabove and below in the claims, can be made without departing from the essence and scope thereof.

What is claimed is:

1. A composition consisting essentially of a major amount of normally solid virgin poly-2-pyrrolidone and about from 0.2 to 6% by weight, based on the weight of said poly-2-pyrrolidone of a thermal stabilizer selected from the group consisting of organic isocyanates having at least one isocyanate substituent and six carbon atoms and a boiling point of at least 250° C.; carbamate thermal precursors which generate said organic isocyanate at temperatures in the range of about from 35° to 265° C., and mixtures thereof, effective to reduce the thermal degradation of said poly-2-pyrrolidone.

2. The composition of claim 1 wherein said composition contains about from 1 to 3% by weight, based on the weight of said poly-2-pyrrolidone, of said thermal stabilizer.

3. The composition of claim 1 wherein said thermal stabilizer is selected from the group consisting of alkyl isocyanates; cycloalkyl isocyanates; alkylcycloalkyl isocyanates; polycycloalkyl polyisocyanates; cycloalkyl-alkylene-cycloalkyl polyisocyanates; aryl polyisocyanates; alkylaryl polyisocyanates; polyether glycol polyisocyanates and thermal precursors thereof; and mixtures thereof, and wherein said isocyanate substituents are respectively on different carbon atoms.

4. The composition of claim 3 wherein said stabilizer is a monoisocyanate.

5. The composition of claim 3 wherein said stabilizer is an organic isocyanate having more than one isocyanate substituent per organic moiety.

6. The composition of claim 4 wherein said thermal stabilizer is selected from the group consisting of alkyl isocyanates having 6 through 27 carbon atoms in the alkyl group.

7. The composition of claim 3 wherein said thermal stabilizer is selected from the group of the compounds having the formula $$R{\text{+}}N{=}C{=}O)_n$$

wherein R is alkyl, having from 6 through 27 carbon atoms, cycloalkyl, having from 6 through 8 carbon atoms; alkylcycloalkyl, having from 6–14 carbon atoms, polycycloalkyl having 6 through 24 carbon atoms or cycloalkyl-alkylene-cycloalkyl, having from 7 through 24 carbon atoms; and n is an integer of from 1 to the maximum isocyanate saturation of R and mixtures thereof.

8. The composition of claim 3 wherein said thermal stabilizer is selected from the group of compounds having the formulas $$R^1{\text{+}}N{=}C{=}O)_n$$

wherein $R^1$ is an aryl group having 6 through 27 carbon atoms or a mono or dialkyl aryl group having 7 through 27 carbon atoms; and n is an integer of from 1 up to the maximum isocyanate saturation of $R^1$ and mixtures thereof.

9. The composition of claim 3 wherein said thermal stabilizer is selected from the group of compounds having the formula:

$$O{=}C{=}N{-}R^2{-}O[{\text{+}}CH_2{\text{+}})_m CHR^6{-}O]_x R^3{-}N{=}C{=}O$$

wherein $R^2$ and $R^3$ are independently selected from the group consisting of alkylene, arylene, each having 6 through 12 carbon atoms and alkylaryl having 7 through 14 carbon atoms; $R^6$ is hydrogen or alkyl having 1 through 6 carbon atoms; x is a whole integer of from 1 to 100; m is a whole integer from 1 to 11; and mixtures thereof.

10. The composition of claim 9 wherein x is a whole integer of from 5 to 20.

11. The composition of claim 1 wherein said thermal stabilizer is said thermal precursor of said organic isocyanate.

12. The composition of claim 7 wherein said composition contains about from 1 to 3% by weight, based on the weight of said poly-2-pyrrolidone, of said thermal stabalizer and wherein said thermal stabilizer is hexyl 1,6-diisocyanate.

13. The composition of claim 10 wherein said composition contains about from 0.2 to 6% by weight, based on the weight of said poly-2-pyrrolidone of said thermal stabilizer and wherein said stabilizer is a polyether glycol diisocyanate.

14. The composition of claim 11 wherein said thermal precursor is a polyether glycol dicarbamate having the formula

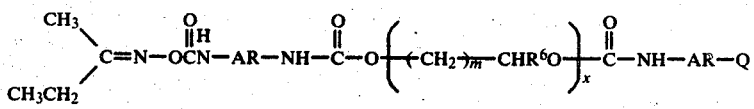

wherein AR is an arylene or alkylarylene group; R⁶ is hydrogen or alkyl having 1 through 6 carbon atoms, and Q is a radical having the formula

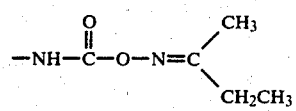

x is a whole integer of from 5 to 20, and m is 1, 2, or 3.

15. The composition of claim 14 wherein said composition contains about from 0.2 to 6% by weight, based on the weight of said poly-2-pyrrolidone, of said thermal precursor.

16. A method of melt-extruding poly-2-pyrrolidone comprising melt extruding the composition of claim 1 at temperatures in the range of about from 260°–285° C.

17. The method of claim 16 wherein said composition is extruded at temperatures in the range of from 260°–280° C.

18. A method of melt-extruding poly-2-pyrrolidone comprising melt extruding the composition of claim 3 at temperatures in the range of about from 260°–280° C.

19. A method of melt-extruding poly-2-pyrrolidone comprising melt extruding the composition of claim 6 at temperatures in the range of about from 260°–280° C.

20. A method of melt-extruding poly-2-pyrrolidone comprising melt extruding the composition of claim 7 at temperatures in the range of about from 260°–280° C.

21. A method of melt extruding poly-2-pyrrolidone comprising melt extruding the composition of claim 14 at temperatures in the range of about from 260°–280° C.

* * * * *

UNITED STATES PATENT AND TRADEMARK OFFICE
CERTIFICATE OF CORRECTION

PATENT NO. : 4,261,881
DATED : April 14, 1981
INVENTOR(S) : Gar L. Woo

It is certified that error appears in the above-identified patent and that said Letters Patent are hereby corrected as shown below:

Column 7, line 16, "18,000", should read --28,000--.

Column 7, line 54, "$C_{12}$", should read --$C_{16}$--.

Column 8, line 27, "claim 4", should read --claim 3--.

Signed and Sealed this

Tenth Day of November 1981

[SEAL]

Attest:

GERALD J. MOSSINGHOFF

*Attesting Officer*   *Commissioner of Patents and Trademarks*